United States Patent [19]
Ishiguro et al.

[11] 4,143,958
[45] Mar. 13, 1979

[54] CONTROLLING CIRCUIT FOR ELECTRIC SHUTTERS

[75] Inventors: Yasuo Ishiguro; Kenji Wakazono, both of Tokyo, Japan

[73] Assignee: Copal Company Limited, Tokyo, Japan

[21] Appl. No.: 838,225

[22] Filed: Sep. 30, 1977

[30] Foreign Application Priority Data

Oct. 8, 1976 [JP] Japan .................. 51-134868[U]
Dec. 27, 1976 [JP] Japan .................. 51-159907

[51] Int. Cl.² ........................................ G03B 17/40
[52] U.S. Cl. ................................. 354/267; 354/234
[58] Field of Search .............. 354/50, 51, 60 R, 234, 354/235, 258, 267, 23 D; 353/91; 352/169, 204; 361/156

[56] References Cited
U.S. PATENT DOCUMENTS

| 3,160,795 | 12/1964 | Aune | 361/156 |
| 3,886,443 | 5/1975 | Miyakawa et al. | 354/60 X |
| 3,947,855 | 3/1976 | Inoue et al. | 354/50 |
| 3,947,858 | 3/1976 | Ishida | 354/234 |
| 3,953,867 | 4/1976 | Kondo | 354/51 |
| 3,980,400 | 9/1976 | Maida | 352/169 |
| 4,024,553 | 5/1977 | Maitani et al. | 354/268 X |

Primary Examiner—L. T. Hix
Assistant Examiner—William B. Perkey
Attorney, Agent, or Firm—Cushman, Darby & Cushman

[57] ABSTRACT

A controlling circuit for electric shutters wherein, in an electric shutter adapted to start a shutter closing moton by energizing a driving coil with a discharge current from a capacitor, the capacitor is made to be discharged by a voltage drop detecting circuit provided so that the shutter may be positively closed even in case a current source switch is opened by an unexpected accident in the course of an exposure controlling operation.

8 Claims, 6 Drawing Figures

CONTROLLING CIRCUIT FOR ELECTRIC SHUTTERS

BACKGROUND OF THE INVENTION (a) Field of the Invention

The present invention relates to electric shutters and more particularly to improvements in a controlling circuit adapted to an electric shutter of a type wherein a shutter closing operation is started by passing an electric current to a driving coil.

(b) Description of the Prior Art

In a photographic camera in which this kind of shutter is incorporated, unless a current source is kept connected to an operation controlling circuit until an exposing operation ends, a trouble will be caused. That is to say, if the current source is cut off the operation controlling circuit in the course of the exposing operation, a controlling signal to pass a current to a driving coil (such as an electromagnet, plunger or solenoid) to start a shutter closing operation will not be issued forever and the shutter will remain open. Therefore, as a result, not only the film frame exposed by that time but also the film frame in case the film is then wound up will be spoiled. Such matter will be likely to occur in case a comparatively dark object is to be photographed.

SUMMARY OF THE INVENTION

An object of the present invention is to provide an electric controlling circuit wherein, in a shutter of the above mentioned type. in case a current source is cut off a circuit in the course of an exposing operation, an electric current will be immediately fed to a driving coil to close the shutter.

According to the present invention, this object is attained by connecting a voltage drop detecting circuit to a connecting point of a driving coil with a capacitor so that, when a current source is cut off a circuit, a switching means to flow a discharge current of the capacitor to the driving coil may be made to conduct by the voltage drop detecting circuit.

According to a preferred embodiment of the present invention, a switching means consists of a first transistor having an emitter connected to a capacitor and a collector connected to a driving coil and a voltage drop detecting circuit consists of a second transistor having an emitter connected to the connecting point of the driving coil with the capacitor, a base connected to a current source through a current source switch and a collector connected to the base of the first transistor.

According to another embodiment, a voltage drop detecting circuit consists of a second transistor having an emitter connected to a connecting point of a driving coil with a capacitor and a collector connected to the base of the above mentioned first transistor, a third transistor having a collector connected to the base of the second transistor, a reference voltage dividing circuit in which a voltage dividing point is connected to the base of the third transistor and a comparing voltage dividing circuit in which a voltage dividing point is connected to the emitter of the third transistor. The reference voltage dividing circuit consists of a resistor and a Zener diode connected to this resistor.

According to still another embodiment of the present invention, a voltage drop detecting circuit consists of a reference voltage dividing circuit and a comparing voltage dividing circuit for detecting a voltage drop connected respectively to capacitors, two input terminals connected to the respective voltage dividing points of these two voltage dividing circuits and a comparator having an output terminal connected to the base of a transistor formed as a switching means.

According to another feature of the circuit of the present invention, when a current source is cut off a circuit, in case a proper exposure time is obtained before the voltage between the terminals of the capacitor drops to a predetermined value by feeding a discharge current from a capacitor to an exposure time controlling circuit and voltage drop detecting circuit, a switching means will be made to conduct by an electric signal issued from the exposure time controlling circuit to close the shutter. The above mentioned capacitor may be provided separately from the capacitor used to energize the driving coil.

DESCRIPTION OF THE PREFERRED EMBODIMENTS

Figure 1:
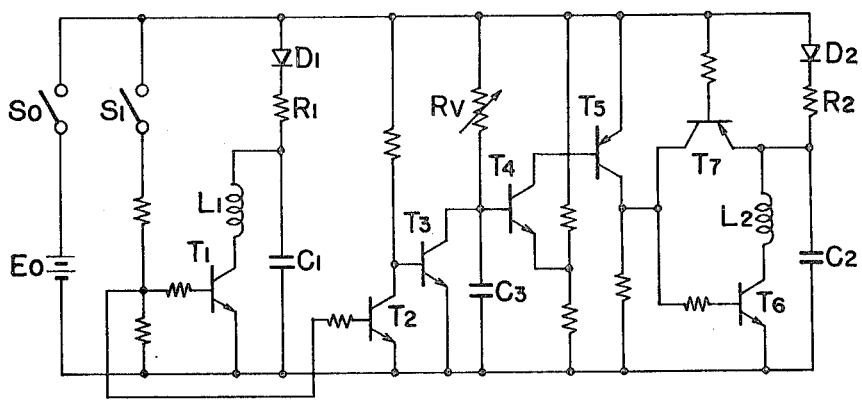
FIGS. 1, 2, 3, 4 and 5 are wiring diagrams showing different embodiments of the controlling circuit for electric shutters according to the present invention.

First, in FIG. 1, reference symbol $E_0$ indicates a current source, $S_0$ indicates a current source switch, $S_1$ indicates an exposing operation starting switch, $L_1$ and $L_2$ indicate driving coils used respectively to start shutter opening and closing operations, $C_1$, $C_2$ and $C_3$ indicate capacitors, $R_1$ and $R_2$ indicate resistors, $R_v$ indicates a variable resistor, $D_1$ and $D_2$ indicate reverse flow preventing diodes, and $T_1$, $T_2$, $T_3$, $T_4$, $T_5$, $T_6$ and $T_7$ indicate transistors. By the way, the capacitors $C_1$ and $C_2$ are to be used to energize respectively the driving coils $L_1$ and $L_2$, and the capacitor $C_3$ forms a delay circuit for controlling the exposure time in cooperation with the variable resistor $R_v$. The switches $S_0$ and $S_1$ are so arranged as to be closed in turn at intervals by the camera releasing operation.

First of all, when the current source switch $S_0$ is closed, the capacitors $C_1$ and $C_2$ will be charged respectively through the diode $D_1$ and resistor $R_1$ and through the diode $D_2$ and resistor $R_2$. When the switch $S_1$ is closed after a predetermined time, the transistor $T_1$ will be on. As a result, a large current will be momentarily fed to the driving coil $L_1$ from the capacitor $C_1$ and a locking device not illustrated will be operated by the energization of the driving coil $L_1$ to open the shutter. In such case, the current from the capacitor $C_1$ will be prevented by the diode $D_1$ from being fed to the driving coil $L_2$. On the other hand, when the switch $S_1$ is closed, the transistor $T_2$ will be on and the transistor $T_3$ will be cut off. Therefore, the capacitor $C_3$ will be started to charge through the variable resistor $R_v$. Then, when a certain time (that is, a proper exposure time) elaspes, transistors $T_4$, $T_5$ and $T_6$ will be on. As a result, a large current will be momentarily fed to the driving coil $L_2$ from the capacitor $C_2$ and a locking device not illustrated will be operated by the energization of the driving coil $L_2$. Thus one exposing operation will be completed. In such case, the current from the capacitor $C_2$ will be prevented by the diode $D_2$ from being fed to the coil $L_1$.

The above mentioned operation will be able to be properly made so long as the current source switch $S_0$ is closed. By the way, during this controlling operation, the voltage $V_c$ between the terminals of the capacitor $C_2$ will be held at a value smaller than the voltage $V_{cc}$ of the current source $E_0$ by the voltage $V_D$ in the normal direction of the diode $D_2$ and therefore the transistor $T_7$ will not be on. However, if the current source switch $S_0$ is open by any cause in the course of the above mentioned exposing operation, the voltage impressed on the base of the transistor $T_7$ will become zero, therefore, the discharge current from the capacitor $C_2$ will flow toward the base from the emitter of the transistor $T_7$ and said transistor $T_7$ will be on. As a result, the collector current of the transistor $T_7$ will flow into the base of the transistor $T_6$ and said transistor $T_6$ will be on. Therefore, a large current will be fed from the capacitor $C_2$ to the driving coil $L_2$ and the shutter will be closed the same as in the above described case.

As evident from the above explanation, the transistor $T_7$ and diode $D_2$ form a voltage drop detecting circuit so as to serve to close the shutter by switching the transistor $T_6$ on when the current source switch $S_0$ is opened, that is, when the current source is cut off the circuit.

Figure 2:
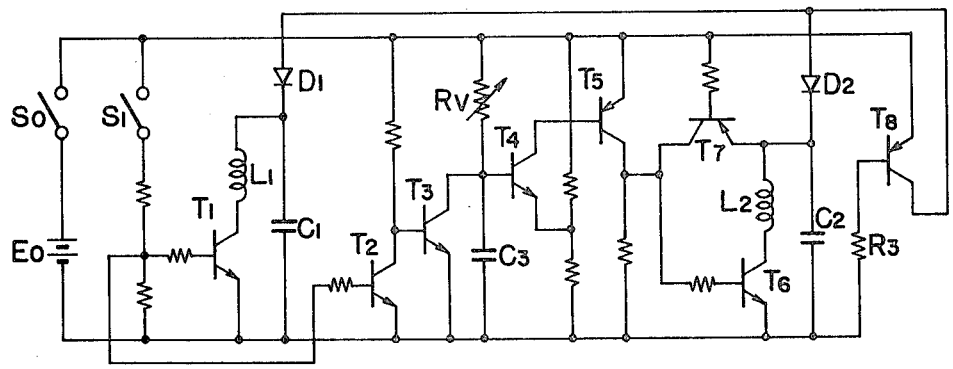
Figure 3:
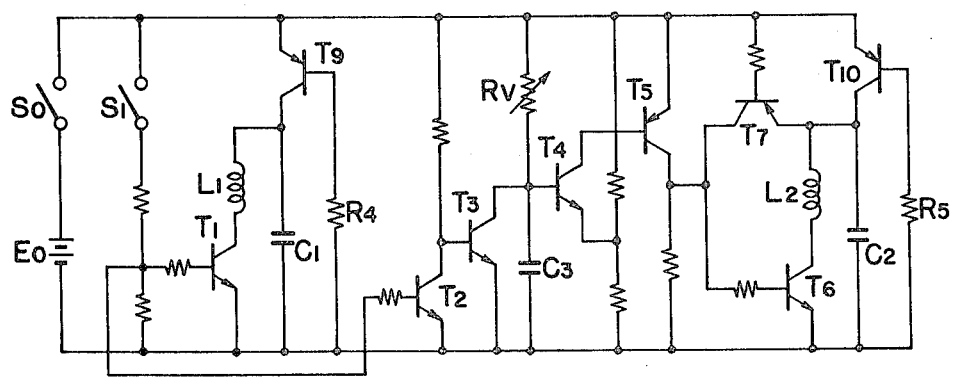

In the above mentioned embodiment, the capacitors $C_1$ and $C_2$ are so made as to be charged through the resistors $R_1$ and $R_2$. However, FIGS. 2 and 3 show embodiments modified so that the capacitors $C_1$ and $C_2$ may be charged through a constant current circuit. That is to say, in FIG. 2, there is added a constant current circuit comprising a transistor $T_8$ and a resistor $R_3$ wherein the base of the transistor $T_8$ is connected to the negative pole of the current source battery $E_0$ through the resistor $R_3$, the emitter of the transistor $T_8$ is connected to the positive pole of the current source battery $E_0$ through the current source switch $S_0$ and the collector of the transistor $T_8$ is connected to the capacitors $C_1$ and $C_2$ respectively through the diodes $D_1$ and $D_2$. In this case, as a matter of course, the resistors $R_1$ and $R_2$ will be removed. In FIG. 3, a constant current circuit comprising a transistor $T_9$ and a resistor $R_4$ is used to charge the capacitor $C_1$ with a constant current and another constant current circuit comprising a transistor $T_{10}$ and a resistor $R_5$ is used to charge the capacitor $C_2$. Such constant current charging system has an advantage that the time required to complete the charging may be shorter than in such CR charging system as in FIG. 1.

Figure 4:
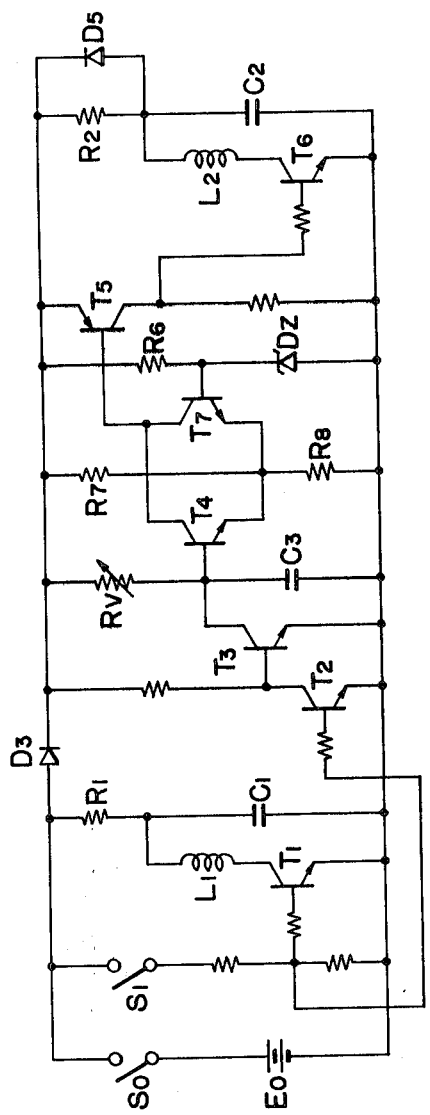

FIG. 4 shows an embodiment wherein a voltage drop detecting circuit somewhat different from the ones shown in FIGS. 1, 2 and 3. In this embodiment, the same corresponding reference symbols are attached to the same elements as are shown in FIGS. 1 to 3. According to this embodiment, a voltage drop detecting circuit is connected to a part of an exposure time controlling circuit including the transistors $T_2$, $T_3$, $T_4$ and $T_5$, variable resistor $R_v$, capacitor $C_3$ and a resistor $R_7$ and a resistor $R_8$ forming a reference voltage dividing circuit. That is to say, the voltage dividing point of the reference voltage dividing circuit for controlling the exposure time is connected to the emitter of the transistor $T_7$, the collector is connected to the base of the transistor $T_5$ and further the base is connected to a voltage dividing point of a reference voltage dividing circuit consisting of a resistor $R_6$ and a Zener diode $D_z$. The reference voltage dividing circuit consisting of the resistor $R_6$ and Zener diode $D_z$ is used to detect voltage drops and the reference voltage dividing circuit consisting of the resistors $R_7$ and $R_8$ is utilized as a comparing voltage dividing circuit for detecting voltage drops. The fundamental operation of this circuit is identical to that of the case of the already explained embodiment and therefore shall not be explained here. However, this embodiment has a feature that, when the current source switch $S_0$ is opened in the course of the exposing operation, the discharge voltage of the capacitor $C_2$ will be fed to the entire circuit on the right side from the diode $D_3$ through a diode $D_5$ connected in parallel with the resistor $R_2$. That is to say, the divided voltage by the resistors $R_7$ and $R_8$ will gradually drop due to the drop of voltage between the terminals of the capacitor $C_2$. When the emitter potential of the transistor $T_7$ becomes lower than its base potential given by the Zener diode $D_z$ (the voltage $V_{BE}$ of the transistor $T_7$ is neglected for covenience sake), the transistor $T_7$ will conduct to make the transistors $T_5$ and $T_6$ conduct and to close the shutter as already described. In other words, according to this controlling circuit, if the transistor $T_4$ is made to conduct by the exposure time controlling operation before the transistor $T_7$ conducts, the shutter will be closed under a proper exposure condition. In this case, during the exposure controlling operation in the process of discharging the capacitor $C_2$, the emitter potential of the transistor $T_4$ will drop but, due to the voltage drop by the discharge of the capacitor $C_2$, the ability of charging the capacitor $C_3$ will also reduce and they will be canceled with each other to make a substantially proper exposure controlling operation.

Figures 5, 6:
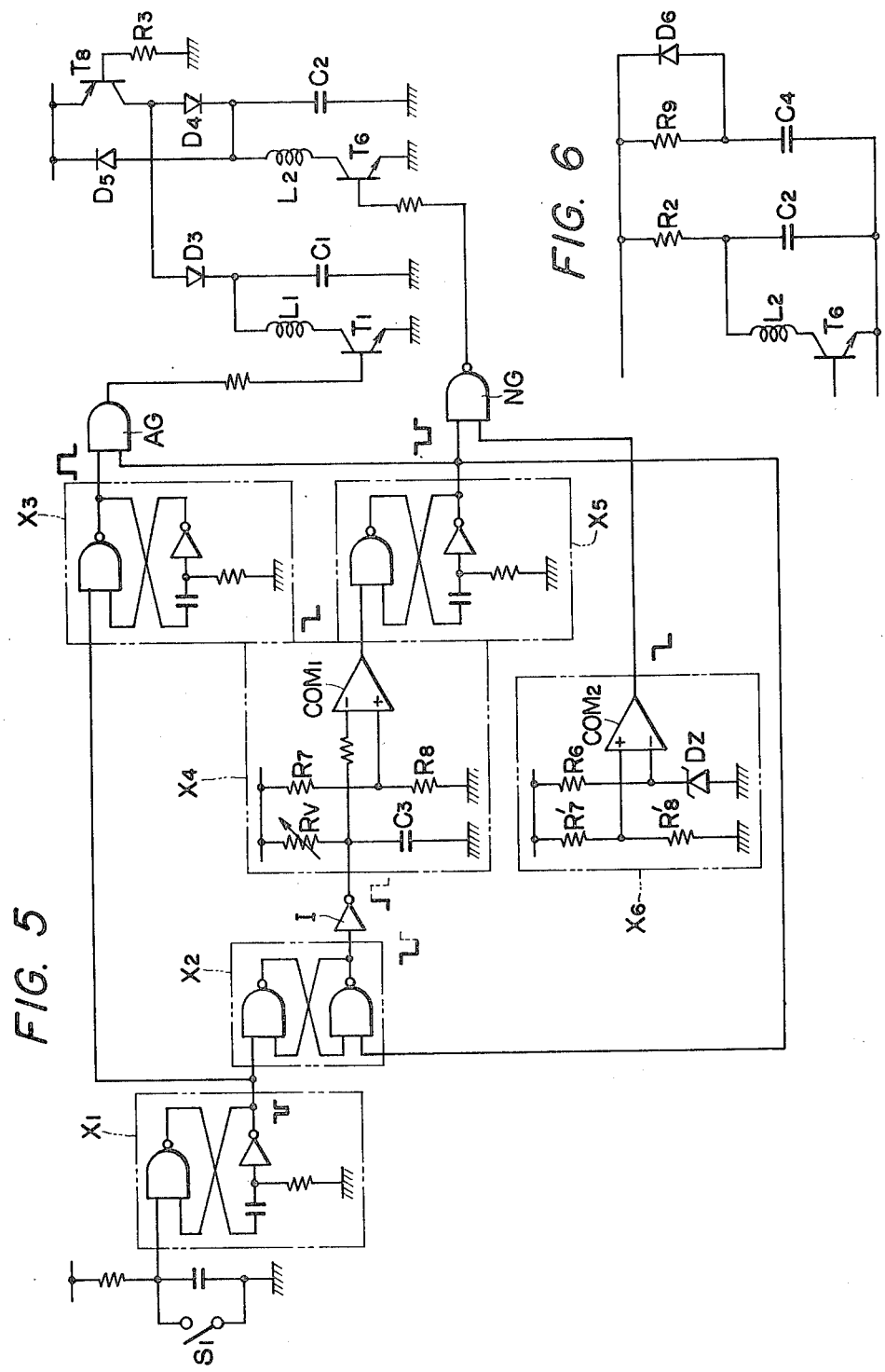
FIG. 6 is a partial wiring diagram corresponding to FIGS. 4 and 5 showing an embodiment in the case that a capacitor for feeding a discharge current to the entire circuit is provided separately from the capacitor for energizing the driving coil.

FIG. 5 shows further another embodiment fundamentally similar to the embodiment in FIG. 4. In the drawing, reference symbols $X_1$, $X_3$ and $X_5$ indicate one-shot multivibrator circuits (which shall be described as OSM circuits hereinafter), $X_2$ indicates a flip-flop circuit (which shall be described as an FF circuit hereinafter), $X_4$ indicates an exposure time controlling circuit including a comparator $COM_1$ having one input terminal connected to a connecting point of the variable resistor $R_v$ with the capacitor $C_3$ and the other input terminal connected to a connecting point of the resistor $R_7$ with the resistor $R_8$, $X_6$ indicates a voltage drop detecting circuit provided with the same resistors $R'_7$ and $R'_8$ respectively as the resistors $R_7$ and $R_8$ in FIG. 4 including a comparator $COM_2$ having one input terminal connected to a connecting point of the resistor $R'_7$ with the resistor $r'_8$ and the other input terminal connected to a connecting point of the resistor $R_6$ with the Zener diode $D_z$, I indicates an inverter, AG indicates an AND gate, NG indicates a NAND gate, $T_8$ and $R_3$ indicate respectively a transistor and resistor forming a constant current circuit to charge the capacitors $C_1$ and $C_2$ with a constant current, $D_4$ indicates the same reverse flow preventing diode as the diode $D_3$, and $S_1$ indicates the same switch as in FIG. 4 to be temporarily closed in the process of a releasing operation.

When a releasing operation is made in photographing, the current source will be connected to the entire circuit and then the switch $S_1$ will be closed temporarily. When the switch $S_1$ is closed, the OSM circuit $X_1$ will be set by an "L" level pulse given to the input and the output will turn the "L" level for a very short predetermined time. By this operation, the OSM circuit $X_3$ will be set and its output will turn the "H" level for a predetermined time. Accordingly, the AND gate AG will be opened and the output will turn to the "H" level since one input connected to the output of the OSM circuit $X_5$ is on the "H" level but the other input connected to the output of the OSM circuit $X_3$ is also on the "H" level. As a result, the transistor $T_1$ will conduct to flow the discharge current from the capacitor $C_1$ to the driving coil $L_1$ and to open the shutter as already explained. On the other hand, the FF circuit $X_2$ will be set by the turn of the OSM circuit $X_1$ to the L level and its output will turn to the "L" level. Therefore, the exposure time controlling circuit $X_4$ will begine to operate when the connecting point of the capacitor $C_3$ with the variable resistor $R_v$ is lifted to the "H" level through the inverter I. In this operating process, when the current source is cut off the circuit, the discharge voltage of the capacitor $C_2$ will be fed to the entire circuit through the diode $D_5$. When one input of the NAND gate NG is on the "L" level due to the turn of the exposure time controlling circuit $X_4$, the turn of the predetermined time of the OSM circuit $X_5$ or the turn of the voltage drop detecting circuit $X_6$, the output of the NAND gate NG will turn to the "H" level. At this time, the transistor $T_6$ will conduct to flow the discharge current from the capacitor $C_2$ to the driving coil $L_2$ and to close the shutter as already explained. By the way, the predetermined time for the turn of the OSM circuit $X_3$ and $X_5$ is to be set to be the time required to energize the driving coil $L_1$ and driving coil $L_2$ with discharge currents from the capacitors $C_1$ and $C_2$. Further, the FF circuit $X_2$ is to be reset by the turn to the "L" level of the output of the OSM circuit $X_5$ with the end of the exposure time controlling operation. Therefore, in order to positively reset it, the predetermined time of the turn to the "L" level of the output of the OSM circuit $X_1$ is set to be so short as to return it to the "H" level earlier than the generation of the signal of resetting it.

In the embodiments in FIGS. 4 and 5, the capacitor $C_2$ for energizing the coil $L_2$ is to be used in common as a current source after the current source $E_0$ is cut off. In this case, as shown in FIG. 6, a capacitor circuit including a capacitor $C_4$, a resistor $R_9$ and a diode $D_6$ may be separately formed and provided as a current source for the entire circuit.

We claim:

1. A controlling circuit for electric shutters comprising a current source, a current source switch connected to said current source, an exposing operation starting switch connected to said current source, a first driving coil connected to said exposing operation starting switch and capable of being energized to start a shutter opening motion when said current source switch and exposing operation starting switch are closed, an exposure time controlling circuit connected to said current source through said current source switch and capable of starting its operation simultaneously with opening the shutter and capable of issuing an electric signal when a proper exposure time elapses, switching means connected to said exposure time controlling circuit and capable of being made conductive by the issuance of said electric signal from said exposure time controlling circuit, a second driving coil connected to said switching means and capable of starting a shutter closing motion when energized by the conduction of said switching means, a first capacitor connected between said second driving coil and switching means and capable of being charged by said current source when said current source switch is closed and capable of flowing a discharge current to said second driving coil when said switching means are made conductive, and a voltage drop detecting circuit connected between said first capacitor and said second driving coil, and said switching means, said switching means being made conductive through said voltage drop detecting circuit when said current source switch is opened before said exposure time controlling circuit issues said electric signal or when the voltage of said current source is lower than a predetermined value.

2. A controlling circuit for electric shutters according to claim 1 wherein said switching means comprises a first transistor having an emitter connected to said first capacitor and having a collector connected to said driving coil, and said voltage drop detecting circuit consists of a second transistor having an emitter connected to the connecting point of said first capacitor with said driving coil and having a base operatively connected to said current source through said current source switch and having a collector operatively connected to the base of said first transistor and a diode operatively connected between the base and emitter of said second transistor.

3. A controlling circuit for electric shutters according to claim 1 wherein said switching means comprises a first transistor having an emitter connected to said first capacitor and having a collector connected to said driving coil, and said voltage drop detecting circuit consists of a second transistor having an emitter operatively connected to the connecting point of said first capacitor with said driving coil and having a collector operatively connected to the base of said first transistor, a third transistor having a collector connected to the base of said second transistor, a reference voltage dividing circuit having a voltage dividing point connected to the base of said third transistor and a comparing voltage dividing circuit for detecting the voltage drop having a voltage dividing point connected to the emitter of said third transistor.

4. A controlling circuit for electric shutters according to claim 3 wherein said controlling circuit further comprises a second capacitor connected to said first capacitor, and a discharge current is fed to said voltage drop detecting circuit and said switching means from said second capacitor when said current source switch is opened during an exposure controlling operation.

5. A controlling circuit for electric shutters according to claim 4 wherein said reference voltage dividing circuit comprising a resistor and a zener diode connected to said third transistor.

6. A controlling circuit for electric shutters according to claim 1 wherein said switching means comprises of a transistor having an emitter connected to said first capacitor and having a collector connected to said driving coil, and said voltage drop detecting circuit consists of a reference voltage dividing circuit and a comparing voltage dividing circuit for detecting the voltage drop respectively connected to said first capacitor and a comparator having two input terminals connected to respective voltage dividing points of said two voltage dividing circuits and having an output terminal operatively connected to the base of said transistor.

7. A controlling circuit for electric shutters according to claim 6 wherein said controlling circuit further comprises a second capacitor connected to said first capacitor, and a discharge current is fed to said voltage drop detecting circuit and said switching means from said second capacitor when said current source switch is opened during an exposure controlling operation.

8. A controlling circuit for electric shutters according to claim 1 wherein said controlling circuit further comprises a constant current circuit connected to said first capacitor, and said first capacitor is charged through said constant current circuit by said current source when said current source switch is closed.

* * * * *